(No Model.) 3 Sheets—Sheet 1.
N. BRUETTE.
VENTILATING TOBACCO CURING HOUSES.
No. 359,769. Patented Mar. 22, 1887.
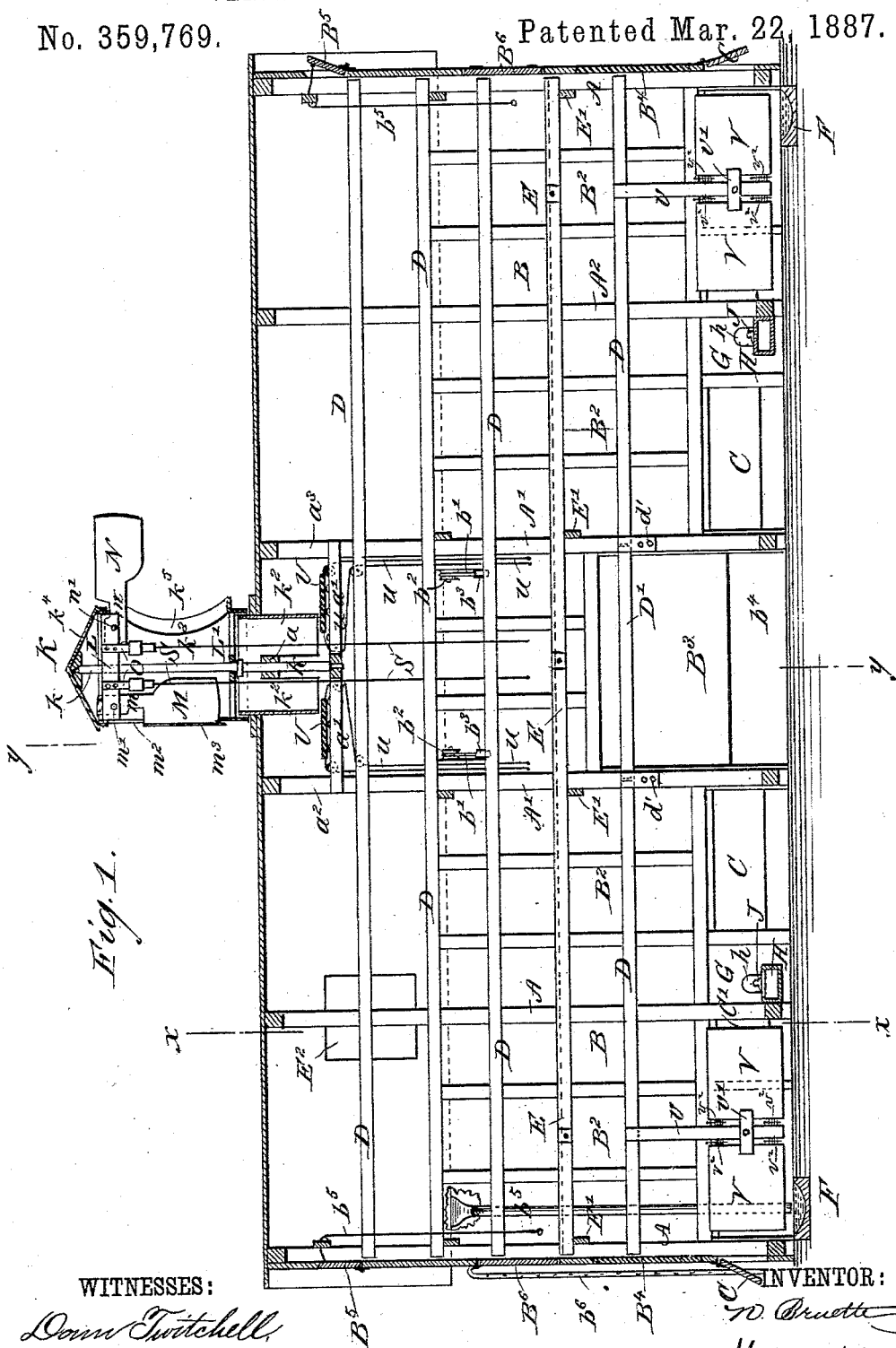

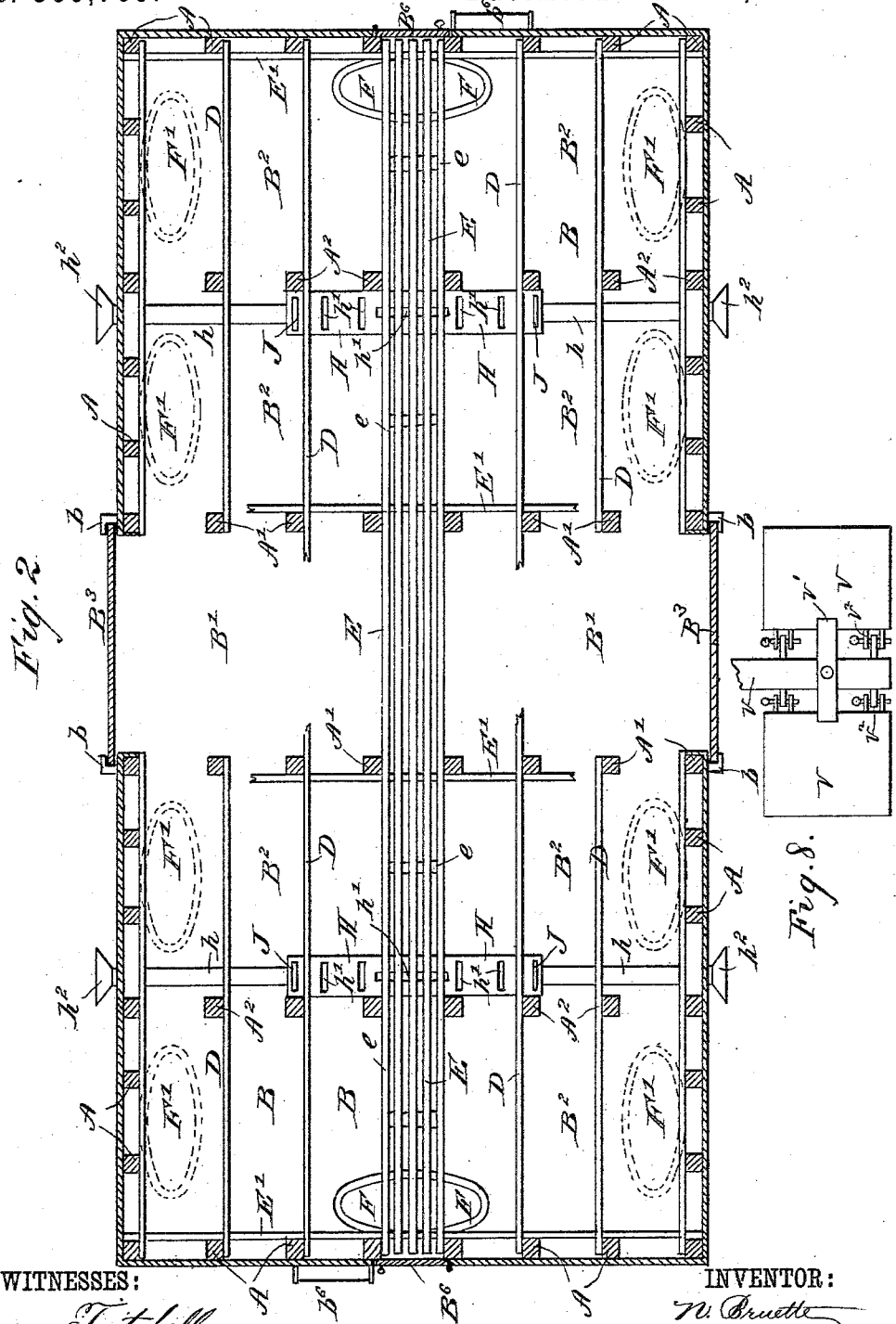

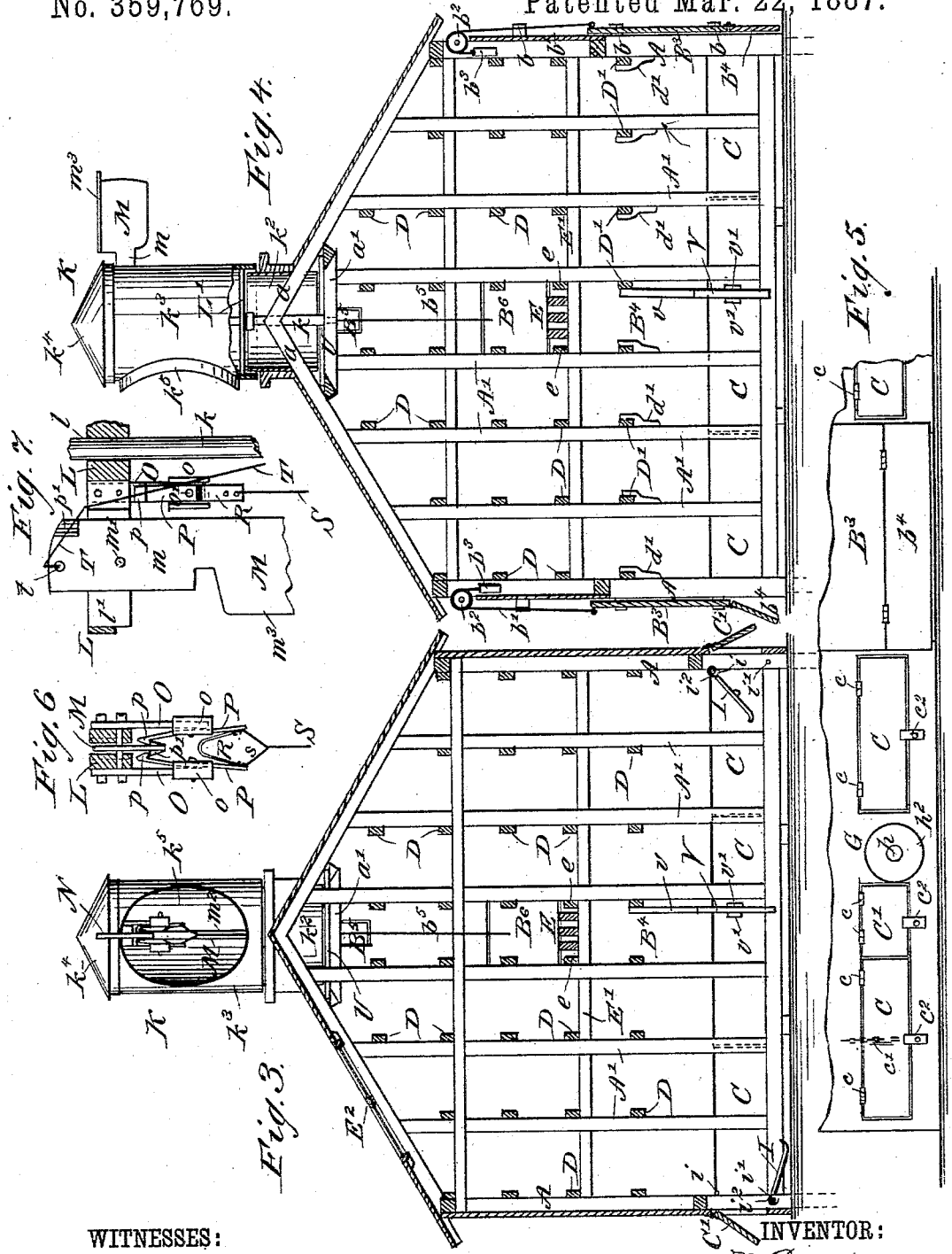

UNITED STATES PATENT OFFICE.

NELSON BRUETTE, OF JEFFERSON, WISCONSIN.

VENTILATING TOBACCO-CURING HOUSES.

SPECIFICATION forming part of Letters Patent No. 359,769, dated March 22, 1887.

Application filed February 10, 1886. Serial No. 191,501. (No model.)

*To all whom it may concern:*

Be it known that I, NELSON BRUETTE, of Jefferson, in the county of Jefferson and State of Wisconsin, have invented a new and Improved Tobacco-Curing House, of which the following is a full, clear, and exact description.

My invention relates to a house adapted for the storage and curing of tobacco-plants, and has for its object to facilitate the proper curing of the plants, whereby they shall have the highest possible market value, and whereby this may be secured easily with the expenditure of much less time and labor of attendants than is required in curing tobacco in houses of other construction.

The invention consists in certain novel features of construction and combinations of parts of the curing-house, all as hereinafter fully set forth.

Reference is to be had to the accompanying drawings, forming part of this specification, in which similar letters of reference indicate corresponding parts in all the figures.

Figure 1 is a vertical longitudinal sectional elevation of a tobacco-curing house embodying my improvements. Fig. 2 is a sectional plan view thereof, partly broken away. Fig. 3 is a cross-sectional elevation taken on the line $x$ $x$, Fig. 1, with the turret ventilator swung round to show its open side. Fig. 4 is a central cross-sectional elevation taken on the line $y$ $y$, Fig. 1, showing the turret ventilator in side view and partly broken away. Fig. 5 is an elevation of part of the lower portion of one side of the curing-house; and Figs. 6 and 7 are enlarged detail views of the turret ventilator, illustrating the devices for operating the vanes to produce an upward or downward draft through the curing-house in connection with the base ventilators. Fig. 8 is an enlarged detail view of the arrester.

The drawings represent a tobacco-curing house about sixty feet long, thirty feet wide, and sixteen feet high from the ground to the eaves of the roof, which latter is shown pitching both ways from the center to the opposite sides of the house, which may be built of any suitable materials, and is shown as a wooden or framed structure, the outside posts, A, of which are set into the ground.

In its general plan the curing-house is divided transversely by two rows of posts, $A'$ $A'$, into two principal divisions, B B, and a central driveway, $B'$, and each of the divisions B is subdivided by a central transverse row of posts, $A^2$, into two sections, $B^2$ $B^2$, the driveway $B'$ and the sections $B^2$ being each about twelve feet wide; but it will be understood that the size of the curing-house and the arrangement of its sections and divisions may vary as the tobacco-crop to be cured shall require.

With the exception of the lower ventilating-doors, the driveway-doors, and certain entrance-doors and gable-doors, to be hereinafter particularly described, the side covering or sheathing of the building all around will be made tight against the entrance or exit of air, and in a building of the size above stated a single turret ventilator, hereinafter described, provides for entrance and exit of air at the roof. These two general features of construction are in marked contrast with the open or slatted sides, and a long series of ventilators, difficult to operate, at the roof, extending quite the full length of tobacco-curing houses, as commonly constructed, and have advantages thereover, as will be hereinafter explained.

At each end of the driveway $B'$, and at opposite sides of the curing-house, are arranged in suitable guides or slideways, $b$, the doors $B^3$ $B^3$, to which are attached the one ends of cords $b'$, which run over pulleys $b^2$, journaled at or near the eaves of the building and having counterbalancing-weights $b^3$ at their inner ends, allowing the doors to be easily and quickly raised or lowered to open and close them, as may be necessary to drive or back in the load of tobacco to be stored in the house, and the vertical movement of the doors $B^3$ allows either of them to be closed down between a wagon backed into the curing-house and the team to shut out winds, which would damage that part of the crop already in the house.

I make the lower part, $b^4$, of each door $B^3$ separate from the main portion of the door and hinge it thereto, said part $b^4$ being about as wide as the lower or base ventilating-door C of the house, to allow these lower parts, $b^4$, of the closed doors to be swung open with the doors C for free entrance or exit of air all around the base of the curing-house when required, and as hereinafter more fully explained.

To the posts A A' A² are secured the horizontal strips D, which serve as bearers for sticks or laths (not shown) on which the tobacco-plants are speared or hung. In the house shown the posts and bearers are arranged to provide for hanging the plants four tiers high across the full width of the house, with an extra narrower tier under the gable-roof, and in seven separate rows running lengthwise of the building. (See Figs. 3 and 4.) The bearers D will be placed apart vertically a sufficient distance to allow the tobacco-plants of one tier to hang clear of those of the adjacent or next higher or lower tier, and the lowest bearers, D, will be about six feet from the ground, which will allow a clear space or chamber between the lowest hanging plants and the ground of about two feet, and through which chamber the air may circulate, as hereinafter more fully explained.

The lower series of bearers, D', which extend across the driveway B', are supported loosely at opposite ends in blocks d', (see Figs. 1 and 4,) fixed to the posts A A', so that these bearers may be removed at any time to allow high wagon-loads of plants to enter the driveway.

At opposite ends of the building there will be doors B⁴, as indicated in Fig. 1, and which extend vertically from a point above the adjacent base ventilator C to a point just below the inspection-walk E, hereinafter described, said doors B⁴ being preferably hinged at one side, so that they afford easy access to the curing-house from the ground, and above the doors B⁴, at each end of the house, are hung at their lower or bottom edges the smaller doors B⁵, to the tops of which are connected cords b⁵, which run over suitable guide-pulleys, and may extend through the inspection-walk E to the ground, and whereby the doors B⁵ may be opened more or less from the walk or from the ground, for purposes hereinafter explained.

Between the doors B⁴ B⁵, and immediately at the ends of the inspection-walk E, which extends the whole length of the curing-house, are hung by side hinges the doors B⁶, allowing entrance to the walk E at either end of the curing-house from ladders b⁶, reaching to the ground, and preferably fixed to the curing-house, as shown in Figs. 1 and 2 of the drawings.

Ladders of any approved kind may be used inside the curing-house to give access to the walk E from the ground or driveway.

The inspection-walk E consists of a series of planks laid parallel, edge upward, and spaced apart by blocks to give free circulation of air through the walk, said walk being supported on cross-timbers E' at about the vertical center of the curing-house, thus allowing the inspector to ascertain by sight or feeling the precise condition of the plants being cured, and enabling him to shift the plants about by means of a hooked rod or other device as the curing of the plants progresses, and as their condition shall require. The two outside or edge planks, e e, of the walk E are made narrower than the other planks of the walk to give room on them and below the general upper face of the walk for one end of tobacco-laths, the other ends of which rest on the adjacent bearers D at the same level. Tightly-fitted glazed window sashes or frames E² (see Fig. 3) set in the roof of the curing-house at suitable places admit sufficient light to inspect or arrange the plants.

At each end of the curing-house, and as shown in full lines in Figs. 1 and 2, are provided basins or reservoirs F, into which rain-water may be conducted by pipes from the roof of the house, or into which water may be pumped from a cistern outside the house, or from any other source of supply. Basins F', providing pools of water, may also be set along the sides of the building, as indicated in dotted lines in Fig. 2. These basins or reservoirs may consist of vessels or troughs set on the floor or ground of the curing-house, or may be cement or brick lined reservoirs built into the ground, as may be preferred. The object of these basins is to provide for charging the air within and next the walls of the curing-house with a sufficient degree of moisture or humidity, caused by the evaporation of the water held in the basins, to counteract the heat absorbing and radiating effect of the curing-house walls occasioned by the effect of the sun's rays on the building, and which, if unchecked by the evaporating water inside of the walls, as above described, would have a tendency to quickly dry out the juices of the tobacco-plants next the sides of the house before their ripening is complete, and which is most likely to happen in hot weather just after the plants are cut and stored in the curing-house. In excessively hot weather the walls of the curing-house may be wet outside occasionally by water thrown from a hose, to aid the evaporation from the inside pools of water in preventing premature drying or withering of the plants.

The base ventilating doors C, which preferably are about fourteen inches wide, and are hinged at their upper edges, as at c, as clearly shown in Fig. 5, to the walls of the curing-house, extend all around the house near the ground, excepting across the end doorways, the driveway, and the small portion or section G of the opposite side walls of the house in each division B thereof, and in which parts G are fitted the induction-pipes h of the air-boxes or distributers H, to be presently described.

About at the center of the opposite sides of each end division B of the curing-house is provided in each of its sides a ventilating-door, C', like the ones C, but preferably shorter, and with which doors C' the air-deflecting plates I are adapted for operation, as hereinafter explained. The doors C C' and the house will have any suitable chain or hooked-rod fixtures, as at c', (see Fig. 5,) by which the doors may be held raised or open, more or less, as required, and buttons $c^2$ are provided to hold the doors closed.

Above and below the openings closed by the doors C' are fastened to the walls of the house at the inside the cross-rods $i\ i'$, respectively, to either of which are adapted the hooks $i^2$, secured to one end of the air-deflecting plate I, which is about as long horizontally as the adjacent ventilating-door C' outside of it. Any suitable hooked rod or other device will be provided to hold the plate I hooked upon either the upper or lower rod, $i$ or $i'$, and at any desired angle with the side wall of the curing-house.

It is obvious that by hanging plate I on the upper rod, $i$, as indicated at the right-hand side of Fig. 3, the air entering at the open door C' will be deflected downward to the ground and past the tobacco hanging next the side of the house, and the air will rebound upward to enter the hanging tobacco at a greater or less distance from the door C', and at or toward or beyond the transverse center of the curing-house, and by hanging the plate I on the lower rod, $i'$, as at the left-hand side of Fig. 3, the air entering at C' may be deflected against the tobacco at or near the side of the curing-house; hence the doors C' and deflecting-plates I together provide a means for admitting and directing regulated quantities of air to any part of the building below the hanging tobacco as the curing progresses.

The air-distributers H, of which I place one across and about the center of each of the divisions B of the curing-house, consist each of a box-like structure, preferably rectangular in form, and provided at its top with a series of slots or openings, $h'$, through which the air admitted from the pipes $h$, connected at the opposite ends of the distributers H, may pass into the curing-house. The pipes $h$ have funnel-shaped ends, $h^2$, outside of the building, the better to catch the air, and at the opposite ends of the distributer, valves J are provided, which may be opened more or less or closed, to regulate the supply of air to the distributers H, as the condition of the tobacco in the house shall require, and as hereinafter more fully explained.

The turret ventilator K, by which, in connection with the base ventilating-doors C, either an upward or downward draft of air through the curing-house may be established and maintained, is supported by its vertical shaft $k$ in two of the roof timbers or rafters $a$, and in horizontal timbers $a'$, fixed to the rafters $a^2\ a^3$, said timbers $a'$ being placed a short distance below the stationary tube or ring $k^2$, over which the rotary body portion $k^3$ of the ventilator is fitted loosely, so as to exclude water from the house, and the body of the ventilator has a suitable cap, $k^4$.

Across the top of the body $k^3$ of the ventilator is fixed a bar, L, which has a central hole, $l$, forming a journal-bearing at the top of the shaft $k$, and cross-bars L', fixed to the body $k^3$, form a bearing on the shaft for the body $k^3$ at its lower end. At opposite ends the bar L has the slots $l'\ l^2$, respectively, in which are pivoted, at $m'\ n'$, the arms $m\ n$ of the vanes M N, said vane M being adapted to be swung upward, into the operative position shown in Fig. 4, through a narrow vertical slot, $m^2$, made in the otherwise closed side of the body $k^3$, and the vane N is arranged to swing upward to the operative position shown in Figs. 1 and 3, at the opposite side of the body $k^3$, which has a large opening, $k^5$, for the passage of air either up or down through the ventilator. The outer edge of the vane M has a flange-strip, $m^3$, fixed to it, which closes the slot $m^2$ when the vane is down, as indicated in Fig. 1.

To the cross-bar L, and between the vanes M N and the shaft $k$, are fixed pairs of hanger-bars O O, to which are hung loosely within guide frame $o\ o$ and on pins $o'\ o'$ the opposite arms, P P, which have shouldered heads $p\ p$ facing each other, and at their lower ends the arms, P P are each connected to the opposite ends of a plate-spring, R, which normally presses the heads $p\ p$ of arms P P toward each other. A cord, $s$, is connected to the lower ends of the arms P P, and to this cord is attached a pull-cord, S, which hangs down within reach of the inspector on the walk E, or a person on the ground or floor of the curing-house. A cord, T, fixed to the arm of each vane M N, beyond its pivot, as at $t$, Fig. 7, also hangs to the ground through or alongside of the inspection-walk E.

Should either of the vanes M N be down and it is desired to raise one of them, its cord T will be pulled to swing the vane up, whereupon shouldered lugs $p'\ p'$ on the inner end of the vane-arm will swing down beneath the heads $p\ p$ of the spring-pressed arms P P, which thus will hold the vane raised, as shown in Fig. 6. To lower either vane it is only necessary to pull on the cord S, which will separate the heads $p\ p$ of arms P P sufficiently to allow the vane to swing down on its pivot within the body of the ventilator. When the vane M is up, the open face of the ventilator K will be held to the wind, and a downdraft through the ventilator will result, and when the vane N is up the closed side of the ventilator will face the wind and an updraft through the ventilator will take place.

To regulate the volume of air passing either into or out of the ventilator K from or to the curing-house, I arrange close to the fixed tube $k^2$, through which the air passes, and on the horizontal timbers $a'$, the sliding doors U U, which preferably run on anti-friction rollers fitted in timbers $a'$, and to the opposite edges of which doors are fastened the ends of pull-cords $u$, which pass over suitable guide-rollers and hang down within reach of a person on the walk E, or on the ground, whereby the doors U, by pulling on their ropes $u$, may be opened to any desired extent, or closed.

A single door U may be used to regulate the passage of air through the turret ventilator K; but the two doors above described are preferred.

In certain conditions of the weather, when the ventilating-doors C at opposite sides of the curing-house are opened more or less to admit air to the tobacco, there would be a tendency of the air to enter at one side of the house and pass freely through its opposite side without passing upward to any great extent into the tobacco from the air space or chamber next the ground, and to correct this tendency and insure a proper supply of air to the plants in certain stages of the curing process I employ what I call "air-arresters," which in the preferred form consist of a couple of plates or wings, V V, hinged to opposite sides of a bar-hanger, $v$, as at $v^2$, which bar is fixed at its upper end to a lower bearer, D, and so that the plates V V may be swung open or into line with each other, and so held by buttons $v'$, pivoted to the hanger $v$, and within the lower air space or chamber, the lower edges of the arrester-plates standing about four inches from the ground. I may use one of the arresters in each division B of the curing-house, as shown in Fig. 1, or an arrester may be fitted in each of the two sections $B^2$ of each division B, as may be best suited to the average weather conditions of different localities. After turning the buttons $v'$ into line with the hangers $v$ the plates or wings of the arresters may be extended across the curing-house, or folded or closed on each other, to offer little or no resistance to the transverse circulation of air in the lower chamber of the house.

The wings or plates V V of the arresters may be fixed to their hangers $v$, which may be journaled to turn axially in or on the bearers D, which support them, and but one plate V may be held to each hanger $v$, the arresters being susceptible of various modified constructions which would serve the same purpose, as will readily be understood.

The operation of the various devices for controlling the air-circulation, and the advantages offered by peculiar construction of parts of the curing-house, may be stated, briefly, as follows:

Under normal or average conditions of weather and temperature, when the crop is first stored in the curing house the vane N of the turret ventilator K will be raised and the lower ventilating-doors, C, will be closed, and whichever way the wind may blow the interior of the house will be supplied with quiet gentle currents of air from the distributers H, and the air will be drawn upward and out of the ventilator K, all sides of the building then being tightly closed. The valves J of the distributers H may be operated to control the quantity of air passing through the distributers as the housed crop shall require.

If the inspector on the walk E discovers a need of more air at any particular portion of the house, he will open one or more of the base ventilators C, which will admit air to the place or places desired, and by opening or closing the doors U U at the throat of the turret ventilator K the air-circulation may be safely controlled.

Should the harvesting and storing of the tobacco be hurried, the crop will not be sufficiently wilted, and will be likely to be crowded in the curing-house, and under these conditions the plants will "strut," or, in other words, the leaves will stand out from the stalk, and will puff up and sweat, and will be liable to drop from the stalk, as poisonous gases are very quickly generated. Furthermore, with the lower tiers of plants in this condition, the air is prevented by them from rising to the upper tiers of plants, and they also will be liable to cold sweats and damage for want of pure warm air. The remedy must be quick, and it is obvious that if the base ventilating-doors C on the windward side of the curing-house were opened the wind would rush through the air space or chamber and out of the open doors C at the other side of the house, and if the leeward doors are closed the wind would strike that side of the building and rebound against the outside tiers of tobacco-plants and dry them too much or too quickly.

To obviate the impending dangers under conditions last above named, it is only necessary to open the arresters V V, as in Fig. 1, and they will resist the free passage of the air through the lower air-space and compel the air to move upward through the plants, and in from six to twelve hours their stiff leaves will be softened, and the air will have free circulation through all parts of the house, and the curing will progress favorably. When the plants soften to the proper degree, the lower outside ventilating-doors, C, will be closed, and the arresters will also be closed or folded, and the distributers H and ventilator K will maintain a proper upward air-circulation through the house. It will be understood that when the arresters are in use, as above stated, the doors U U under the turret ventilator K will be fully opened.

It frequently happens during the curing process, and before the leaves come to color, that a season of damp warm weather comes, and this condition is extremely dangerous to the curing plants, as an upward circulation of air through the curing-house is with difficulty, if at all, secured, and the gases then generated from the plants fill the curing-house, and pure warm air is not supplied to the plants by an upward draft. To quickly remedy this and preserve the plants, the downdraft is resorted to, the vane N will be lowered, and the vane M will be raised, which will swing the open face of the turret ventilator K to the wind, and all the base ventilating-doors C will also be opened, and the air will commence to move downward through the ventilator K and into the curing-house to the lower air space or chamber, and thence out of the open doorways or ventilators at the base, and whereby in a short time—say half an hour—all poisonous gases and bad air will be carried out of the curing-house. The downward volume of air may be controlled by adjusting the doors U U at the throat of the turret ventilator K.

The downward draft through the curing-house may be continued to good advantage during the curing of the last cut and stored part of the crop, and whereby the gases generated from the last-stored plants will be carried out through the open base ventilators, and will not rise in the house, to damage the plants previously stored therein. While the downdraft continues the air-arresters will be folded or closed.

Another use of the turret ventilator K with the downdraft, which may be continued for an hour or two morning and evening, is to cool the loft of the curing-house under the roof, and thereby prevent overheating and the white-veining of the plants, and the end gable-doors, $B^5 B^5$, may be opened for free air-circulation along under the roof to aid the ventilator K to more quickly accomplish this purpose. The gable-doors $B^5 B^5$ also draw the moist air to the ends of the curing-house when it is desired to put the tobacco in case for stripping.

For a curing-house, say, one and one-half as long as the house shown, two turret ventilators K will be employed.

Having thus described my invention, what I claim as new, and desire to secure by Letters Patent, is—

1. In a tobacco-curing house, the combination, with the base ventilating-doors C, of reversible air-deflecting plates detachably hinged to the inside of the building in front of the said doors, substantially as described, whereby provision is made for reversing the plates to direct the air upward or downward, as desired.

2. In a tobacco-curing house, the combination, with the base ventilating-doors C and upper and lower rods, $i\ i'$, of air-deflectors I, adapted to be hung on either rod $i$ or $i'$, to direct the air either upward or downward at different angles, substantially as and for the purposes herein set forth.

3. The combination, with the rotatable body $k^3$ of the ventilator K, having opposite closed and open sides, of the pivoted vanes M N and means for raising and lowering said vanes, substantially as described, whereby provision is made for creating a downward or upward draft, as set forth.

4. The combination, in a tobacco-curing house constructed with close sides, of base ventilators C, fitted therein, a turret ventilator, K, provided with a rotatable body having opposite closed and open sides, pivoted vanes M N, fitted at said closed and open sides, respectively, and means for raising and lowering the said vanes, substantially as shown and described, whereby a downward or upward draft may be induced through the curing-house by raising the vanes M N and adjusting the base ventilators, as herein set forth.

5. The combination, with the pivoted vanes M N of the ventilator K, and shouldered studs $p'$ on the vane-arms, of spring-pressed arms P P, having shouldered heads $p$, adapted to studs $p'$, and pull-cords, as at S T, connected to the arms P and the vanes, substantially as and for the purpose herein set forth.

6. The combination, with a tobacco-curing house having closed sides and provided with base ventilators C, of the ventilator K, provided with the rotatable body $k^3$, having opposite closed and open sides, and with the pivoted vanes M N, and the cut-off U, arranged below the bottom of the ventilator, for controlling the volume of air passing through said ventilator, substantially as herein shown and described.

7. The combination, with a tobacco-curing house having a base ventilating-opening, of the supporting-bar $v$, arranged in front of said opening, the plates V, hinged to said bar, and the button $v'$ on the bar $v$, substantially as herein shown and described.

NELSON BRUETTE.

Witnesses:
 WILL. A. BRUETTE,
 FRED. STOPPENBACH,
 D. H. BROWN.